(12) United States Patent
Niwa et al.

(10) Patent No.: US 9,068,654 B2
(45) Date of Patent: Jun. 30, 2015

(54) GASKET

(75) Inventors: Takahiro Niwa, Tokyo (JP); Hironobu Imanaka, Hamamatsu (JP); Takeshi Murata, Hamamatsu (JP); Manabu Yasuda, Hamamatsu (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/009,735

(22) PCT Filed: Apr. 2, 2012

(86) PCT No.: PCT/JP2012/058897
§ 371 (c)(1),
(2), (4) Date: Dec. 23, 2013

(87) PCT Pub. No.: WO2012/137722
PCT Pub. Date: Oct. 11, 2012

(65) Prior Publication Data
US 2014/0217682 A1 Aug. 7, 2014

(30) Foreign Application Priority Data

Apr. 4, 2011 (JP) ................................. 2011-082441

(51) Int. Cl.
*F02F 11/00* (2006.01)
*F16J 15/10* (2006.01)
(Continued)

(52) U.S. Cl.
CPC ............ *F16J 15/102* (2013.01); *F16J 15/0818* (2013.01); *F16J 15/0831* (2013.01); *F16J 15/067* (2013.01)

(58) Field of Classification Search
CPC .... F16J 15/0818; F16J 15/0831; F16J 15/067

USPC .................. 277/590, 591, 593, 594, 595, 596
See application file for complete search history.

(56) References Cited

U.S. PATENT DOCUMENTS 4,655,463 A * 4/1987 Inciong et al. ................ 277/593
5,054,793 A * 10/1991 Hauenstein et al. .......... 277/313
(Continued)

FOREIGN PATENT DOCUMENTS

| JP | 58-189346 U | 12/1983 |
| JP | 59-188955 U | 12/1984 |
| JP | 09-032924 A | 2/1997 |
| JP | 2000-048835 A | 2/2000 |
| JP | 2010-121715 A | 6/2010 |

(Continued)

OTHER PUBLICATIONS

International Search Report for PCT/JP2012/058897, Mailing Date of Jul. 3, 2012.
(Continued)

*Primary Examiner* — Gilbert Lee
(74) *Attorney, Agent, or Firm* — Westerman, Hattori, Daniels & Adrian, LLP (57) ABSTRACT

A gasket held between opposite flange joint surfaces with a bolt includes a combination of a complex material with a rubber material formed on one or both sides of a steel plate, the complex material having a convex or waveform bead, and a circular metal plate arranged at a bolt portion with a through-hole where a shank of the bolt penetrates and a bearing corresponding portion that corresponds to a bearing of the bolt around the through-hole. The gasket is configured to have the thickness ($H_3$) of the bead provided to the complex material greater than the thickness ($H_2$) of the circular metal plate that is equal to or greater than the thickness ($H_1$) of the complex material. This structure provides a gasket indicating good sealing properties under such circumstances that a flange has low stiffness, a tightening load is reduced, and the distance between bolts is expanded.

8 Claims, 5 Drawing Sheets

(51) Int. Cl.
*F16J 15/08* (2006.01)
*F16J 15/06* (2006.01)

(56) References Cited

U.S. PATENT DOCUMENTS

| | | | | |
|---|---|---|---|---|
| 5,492,343 | A | * | 2/1996 | Smith et al. ............... 277/638 |
| 5,513,603 | A | * | 5/1996 | Ang et al. ................. 123/90.37 |
| 6,039,323 | A | * | 3/2000 | Mockenhaupt et al. ...... 277/593 |
| 6,502,829 | B2 | * | 1/2003 | Watanabe et al. ............ 277/593 |

FOREIGN PATENT DOCUMENTS

| | | |
|---|---|---|
| JP | 2010-133477 A | 6/2010 |
| JP | 2010-249267 A | 11/2010 |

OTHER PUBLICATIONS

Japanese Office Action dated Nov. 26, 2014, issued in Japanese Patent Application No. 2011-082441; w/English Translation. (6 pages).

* cited by examiner

GASKET

TECHNICAL FIELD

The present invention relates to a gasket that is held between opposite flange joint surfaces and thereby exerts excellent sealing properties.

BACKGROUND ART

Gaskets have been known that exert sealing properties by being held between opposite flange joint surfaces with a bolt. Such gaskets include a sealing portion formed in a shape of the flange joint surfaces. The sealing portion adheres between the opposite two surfaces without clearance by tightening with a bolt, and thereby the airtightness is improved.

Nowadays downsizing and a weight reduction are promoted for electrical parts and electronic apparatuses of a vehicle. As a result, structural materials for the electrical parts and electronic apparatuses have lower stiffness, the diameter and extension capacity of a bolt are reduced, and the number of parts tightened with a bolt tends to be decreased. A compressive load of a gasket thus tends to be smaller. In addition, the distance between bolts tends to be increased because of an enlargement of a case resulting from a variety of electrical parts provided therein and because of a reduction of the number of parts tightened with a bolt.

As a sealing configuration and sealing method used under circumstances with a reduction of a tightening load, inferior properties on a flange surface due to lower stiffness, and the like, such methods have been applied that join opposite flange surfaces by applying liquid packing between the joint surfaces and that tighten flanges with a rubber-like elastic body put in a groove fabricated on either of the flanges.

However, the conventional sealing configurations and sealing methods have a problem in that productivity is decreased in such a case that parts are reassembled for reproduction. They have another problem in that handling for maintenance in the aftermarket is difficult. As a solution for these problems, a metal gasket forming a rubber-like elastic layer made of materials such as NBR and foaming NBR on either of or both of thin metal plates is taken notice because of its excellent form stability.

This kind of metal gasket, however, has a problem in that sealing properties are decreased because the thickness of the rubber-like elastic layer widely changes under the joint conditions of low stiffness in a flange and a reduced tightening load. In addition to the low stillness in a flange, an extension of the distance between bolts results in an increase of the flexure of a flange, which is another factor for decreasing the sealing properties. There is another problem that because the metal gasket is manufactured by progressive press working of a coil material, portions except a sealing portion are discarded as cut-out scraps when the size of a case is increased. That renders the yield rate of a material smaller compared with liquid packing and a rubber-like elastic body.

As a gasket that prevents the looseness of a bolt and improves the airtightness of an apparatus, a gasket is known that provides a circular metal frame and a sealing portion in an elastic body circularly extending toward the internal circumference portion of the metal frame and connected to the metal frame. The metal frame forms a through-hole where the shank of a tightening material that tightens between the two surfaces penetrates, and has a bearing corresponding portion that corresponds to the bearing of the tightening material around the through-hole (JP-A-2010-121715).

RELATED ART DOCUMENT

Patent Document

Patent Document 1: JP-A-2010-121715

SUMMARY OF THE INVENTION

Problems to be Solved

The gasket described in JP-A-2010-121715 uses a metal gasket for a tightening portion with a bolt, and that prevents the looseness of a bolt. However, because the gasket uses an elastic body such as a rubber that forms no beads for the clearance between flange surfaces, the elastic body can not sufficiently follow the flexure of a flange under such circumstance that the distance between bolts is large. Sealing properties are thus not sufficiently obtained. Furthermore, the gasket joins a metal frame and the elastic body with adhesive, and that problematically requires a selection, storing, management, and other work for the adhesive.

It is therefore an object of the present invention to provide a gasket with good sealing properties under such tightening circumstances that a flange has low stiffness, a tightening load is reduced, and the distance between bolts is expanded. Another object of the present invention is to provide a gasket that joins a metal board and a complex material without using adhesive.

Means to Solve the Problems

The inventor of the present invention has studied on such problems, and completed the present invention to find out that good sealing properties are indicated under such tightening circumstances that a flange has low stiffness, a tightening load is reduced, and the distance between bolts is expanded with a combination of a complex material with a rubber material formed on both sides of a steel plate, the complex material having a bead, and a circular metal plate arranged at a bolt portion with a through-hole where the shank of the bolt penetrates and a bearing corresponding portion that corresponds to the bearing of the bolt around the through-hole.

The present invention provides a gasket that is held between opposite flange joint surfaces with a bolt. The gasket includes a combination of a complex material with a rubber material formed on both sides of a steel plate, the complex material having a bead, a through-hole where the shank of the bolt penetrates, and a circular metal plate arranged at a bolt portion with a bearing corresponding portion that corresponds to the bearing of the bolt around the through-hole.

Effect of the Invention

According to the present invention, the portion corresponding to the bearing of the bolt holds a load with the metal plate, and a portion corresponding to a flange joint surface between bolt portions is sealed with the bead provided to the complex material. As a result, good sealing properties are indicated under such tightening circumstances that a flange has low stiffness, a tightening load is reduced, and the distance between bolts is expanded. Furthermore, because a joint of the metal plate and the complex material is performed on the outside of the flange joint surface, no effects are exerted on sealing properties. Similarly, because a joint of the metal plate and a divided complex material is performed on the outside of the flange joint surface, there is no possibility that the circular metal plate and the complex material are disengaged, for example, during transportation. The joint is performed by press working, and thus there is no need to use adhesive.

DESCRIPTION OF THE EMBODIMENTS

A gasket in embodiments of the present invention will now be described with reference to FIGS. 1 to 8. A complex material 1 in the figures is actually configured in a two-layer or a three-layer consisting of a steel plate and a rubber material, however, it is illustrated as an integrated figure for simplicity of figures. In addition, the figures show a gasket in a small scale for drawing, which is actually large due to upsizing of a case.

Figure 1:
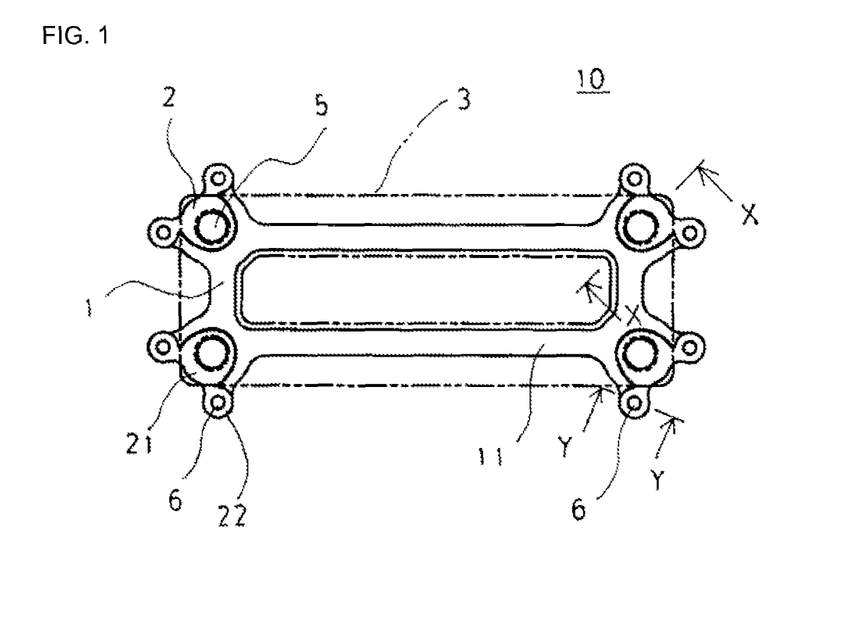
FIG. 1 is a plan view of a gasket in an embodiment of the prevent invention.
Figure 3:
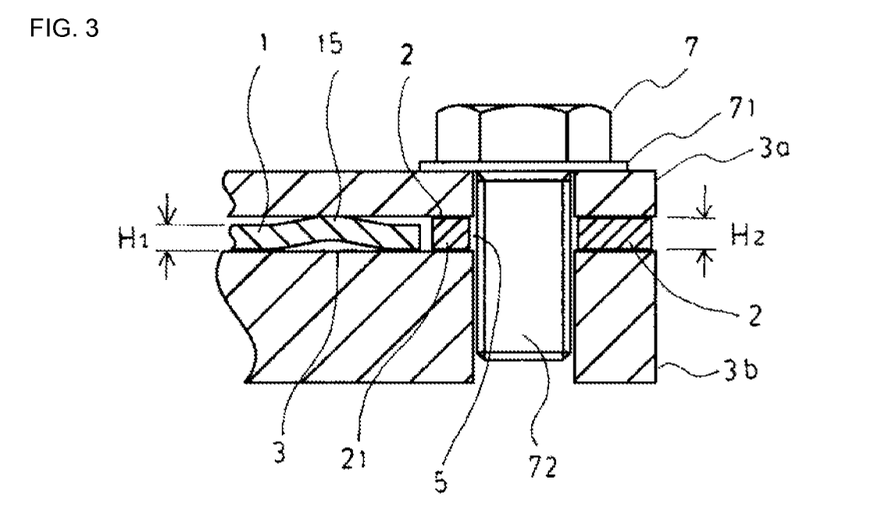
FIG. 3 is a drawing on the status of using of a gasket of this embodiment.
Figure 4A:
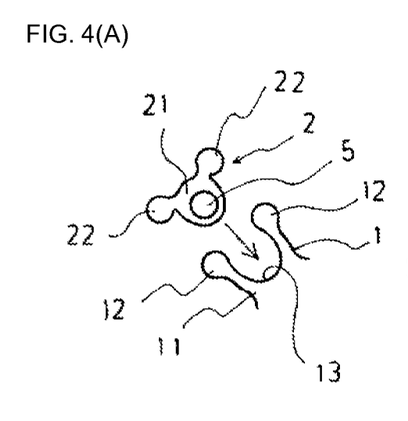
FIG. 4(A) shows the status before a joint of a circular metal plate and a complex material and FIG. 4(B) shows the status after a joint of the circular metal plate and the complex material.
Figure 4B:
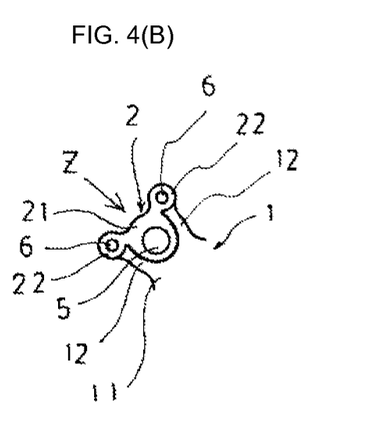

A gasket 10 is held between joint surfaces of opposite flanges 3a and 3b with a bolt 7 as shown in FIGS. 1 and 3. The gasket 10 includes a combination of a complex material 1 with a rubber material formed on both sides of a steel plate, the complex material having a bead 15, and a circular metal plate 2 arranged at a bolt portion with a through-hole 5 where a shank 72 of the bolt 7 penetrates and a bearing corresponding portion 21 that corresponds to a bearing 71 of the bolt around the through-hole 5. In FIG. 1, the double-dotted chain line indicates the outline of a flange joint surface 3. Specifically, the area circled with the double-dotted chain line denotes a flange joint surface.

A stainless steel plate, a Cold-rolled steel plate, an aluminum steel plate, and the like are used for a steel plate of the complex material 1. It is also effective to form rust-proof coating on these kinds of steel plates by performing alkali degreasing and applying known chemical processing thereon. More specifically, a Cold-rolled steel plate can be used on which zinc phosphate or iron phosphate coating is formed. Steel plates with a roughened surface by shot-blasting, scotch-blasting, and the like are also applicable.

Nitrile rubber (NBR), hydrogenated nitrite rubber (H—NBR), functional group-modified nitrile rubber (hereinafter simply called "NBR"), and foamed rubber thereof are used for a rubber layer provide to the complex material 1. Foamed rubber with a quinoid cross-linking is suitable because it has no concerns of metal corrosion due to sulfur liberation. As a cross-linking agent, p-quinone dioxime and p, p'-dibenzoylquinone dioxime are suitable. In using the cross-linking agent, using cross-linking accelerator together with it is preferable from the view point of improving cross-linking efficiency. Compounding a thermal decomposition-type foaming agent or a non-cross-linkage thermal expansible microcapsule into NBR is preferable in the point of foaming. A preferable expanding rate of foaming is 1.2 to 5, and 1.5 to 3 is particularly preferable. The expanding rate of foaming denotes the ratio of the thickness of a rubber layer before foaming to the thickness after foaming. Compounding a filler such as carbon black into NBR is preferable.

The complex material 1 is developed by a method in which a rubber compound is fabricated by compounding the predetermined amount of a cross-linkage additive, a foaming agent, a filler, and other additives into NBR, a coating solution is fabricated by dissolving and dispersing the rubber compound in an organic solvent such as toluene, the coating solution is applied onto a steel plate and is foamed. To further improve sealing properties, it is preferable that the complex material 1 has a steel plate with a rubber material formed on both sides thereof.

Figure 2:
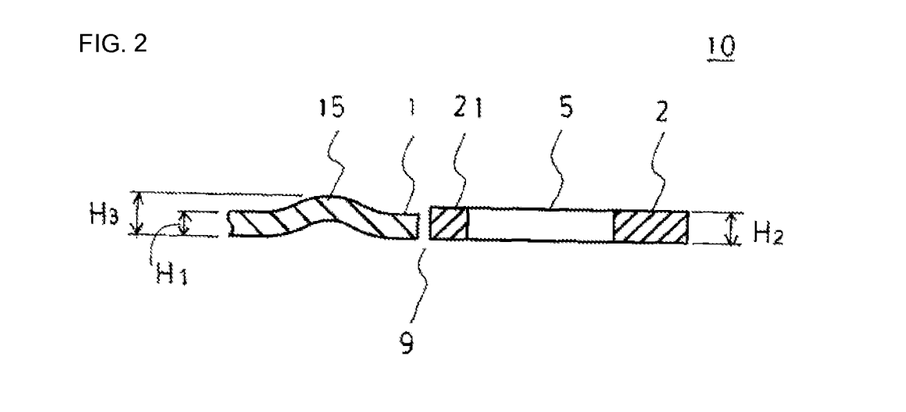
FIG. 2 is a drawing viewed along line X-X in FIG. 1.

As FIG. 1 shows, the complex material 1 includes a sealing portion 11 formed in the shape of a flange joint surface except a near area of a bolt portion. As FIGS. 2 and 3 show, the complex material 1 forms the bead 15 in a protruding height of for example, around 0.2 to 1.0 mm at the marginal portion of a surface that comes into contact with a flange surface 3a when assembled. The bead 15 is circularly formed along the margin of a surface of the complex material 1. In the present invention, a convex bead and a waveform bead are given as an example of a bead. The bead 15 in FIG. 2 is a convex bead, and at the same time, a waveform bead. The number of beads 15 can be one or more. The bead 15 is formed on one or both surfaces of the complex material 1. Forming a bead on the complex material 1 generates high bearing against a flange joint surface, and thereby provides high sealing properties. In addition, a flange portion where the distance between bolts is large has high airtightness, and therefore, good sealing properties are achieved under the tightening condition where a tightening load is reduced.

The complex material 1 furthermore includes a metal plate overlapping portion 12 that is overlapped with the circular metal plate 2. The metal plate overlapping portion 12 is placed on the outside of the flange joint surface. To be placed on the outside of the flange joint surface means that the metal plate overlapping portion 12 is placed on the outside of the external outline figure of a flange joint surface as shown with the two-dotted chain line in FIG. 1. The metal plate overlapping portion 12 thus joins with the circular metal plate 2 on the outside of the flange joint surface 3, and because of this, no effect is exerted on sealing properties between flange joint surfaces, for example, if there exists a protrusion 26 resulting from partial press working. The metal plate overlapping portion 12 is in the shape of arms protruding from a main body portion 11 in a manner of forming a concave portion 13 that corresponds to the shape of the circular metal plate 2 so as to easily join the complex material 1 and the circular metal plate 2 on the outside of the flange joint surface 3 and to obtain a continuous shape to be interlocked near the bolt portion with as less clearance as possible. It is preferable that the metal plate overlapping portion 12 is formed as a single-piece at an area adjacent to the circular metal plate 2 from the view point of joint stability. The present embodiment applies a thin plate shape with a uniform thickness except the bead 15 for the complex material 1. However, the shape is not limited to this, and the metal plate overlapping portion 12 can be configured so that it extends with a bend from the main body portion 11.

Any configurations are applicable for the circular metal plate 2 as long as it has the through-hole 5 and the bearing corresponding portion 21. The present embodiment additionally includes a complex material overlapping portion 22 overlapped with the complex material 1. The complex material overlapping portion 22 bends upward from the bearing corresponding portion 21 and thereafter extends in the horizontal direction. The bearing correspondence denotes an area reflected on the gasket 1 when the bearing 71 of the bolt. 7 is projected from, above.

Figure 5:
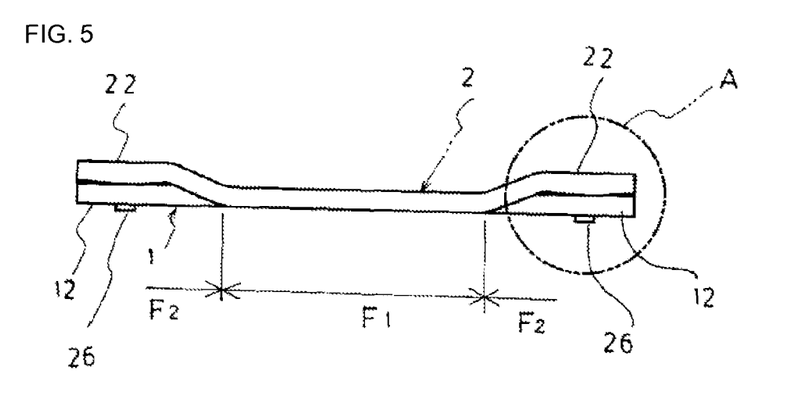
FIG. 5 is a drawing viewed in the Z direction of FIG. 4(B).

The complex material overlapping portion 22 has a shape in that it protrudes outward from both sides of the disc-shaped metal plate 1. It closely enters into the concave portion 13 of the complex material 1 so as to form a continuous shape with the complex material 1, and overlaps with the metal plate overlapping portion 12 on the outside of the flange joint surface 3. In overlapping the complex material overlapping portion 22 with the metal plate overlapping portion 12, the present embodiment bends the circular metal plate 2 as shown in FIG. 5. Without limiting to this, however, such a configuration is possible that the circular metal plate 2 is made flat and the complex material 1 is bent. In FIG. 5, numeral $F_1$ denotes a flange joint surface side, and numeral $F_2$ denotes the outside of the flange joint surface.

In the gasket 10, the complex material 1 and the circular metal plate 2 are not joined with each other except a joint on the outside of the flange joint surface. Because of this, there exists quite small clearance between the complex material 1 and the circular metal plate 2 at the flange joint surface. The metal plate 2, however, receives the tightening load of a bolt, and generates high bearing with the bead 15. Sealing properties between flange joint surfaces are thereby not damaged. Any adhesive agents are not required, and therefore no work such as a selection, storing, and management of adhesive is necessary.

The same steel plate used for the complex material 1 is applicable for a material of the circular metal plate 2. The circular metal plate 2 can form a rubber layer on one or both surfaces. As the rubber layer thereof, the same material for a rubber layer provide to the complex material is applicable. The thickness of the rubber layer is preferably small as 0.020 to 0.025 mm in each surface. By reducing the thickness of the rubber layer, the metal plate 2 can receive the tightening load of a bolt without flexure. It is preferable that the gasket 10 makes the thickness ($H_3$) of the bead 15 of the complex material 1 greater than the thickness ($H_2$) of the circular metal plate 2 as shown in FIG. 2. More preferably, the thickness ($H_3$) of the bead 15 of the complex material 1 is greater than the thickness ($H_2$) of the circular metal plate 2 that is equal to or greater than the thickness ($H_1$) of the complex material 1. When the gasket 10 is assembled between opposite flange joint surfaces and held therebetween with a bolt, as shown in FIG. 3, the area corresponding to the bearing 71 of the bolt 7 is sealed with the metal plate 2, and the flange joint surfaces between bolt portions are sealed with the bead 15 of the complex material 1. Consequently, good sealing properties are indicated under such tightening circumstances that a flange has low stiffness, tightening load is reduced, and the distance between bolts is expanded. In the case of arranging a rubber-like elastic body and a material with a thick rubber layer at the area corresponding to the bearing 71 of the bolt 7, the rubber-like elastic body is pressed with a small load in fastening the assembly with a bolt. The flexure of a flange between bolt portions is thereby encouraged, and that results in reduction of sealing properties. Conversely, the present invention suppresses the flexure of a flange by receiving a tightening load of bolt with a metal plate, and ensures sealing properties by generating local high bearing with a bead provided to a complex material. The thickness ($H_3$) of the bead 15 indicates the height from the bottom surface of the complex material 1 where no beads 15 is formed in a bead portion as shown in FIG. 2. In the case of using foamed rubber for a rubber layer provide to the complex material 1, the thickness ($H_2$) of the circular metal plate 2 can be smaller than the thickness ($H_1$) of the complex material 1. With such a relationship, the area corresponding to the bearing 71 of the bolt 7 is similarly sealed with the circular metal plate 2 and flange joint surfaces between bolt portions are sealed with the bead 15 of the complex material 1 after tightening the assembly with a bolt. Good sealing properties are therefore indicated under such tightening circumstances that a flange has low stiffness, a tightening load is reduced, and the distance between bolts is expanded.

Figure 6:
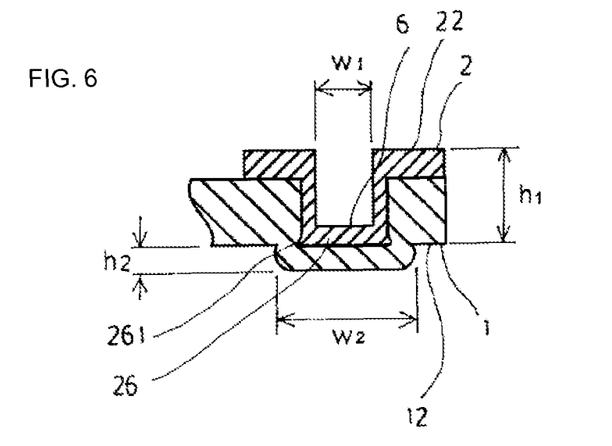
FIG. 6 is an enlarged sectional view of the inside of the circular form A of FIG. 5.
Figure 7:
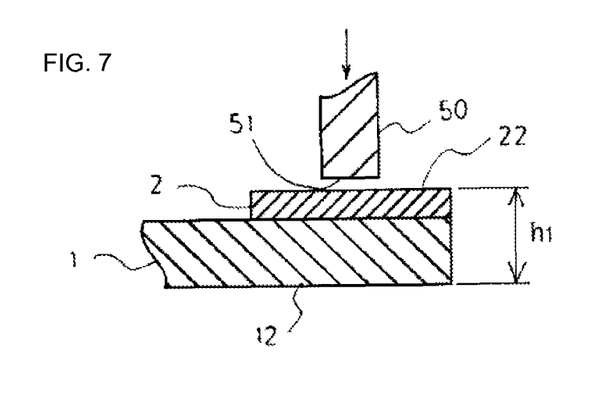
FIG. 7 is a drawing illustrating a joint method of a circular metal plate and a complex material.
Figure 8:
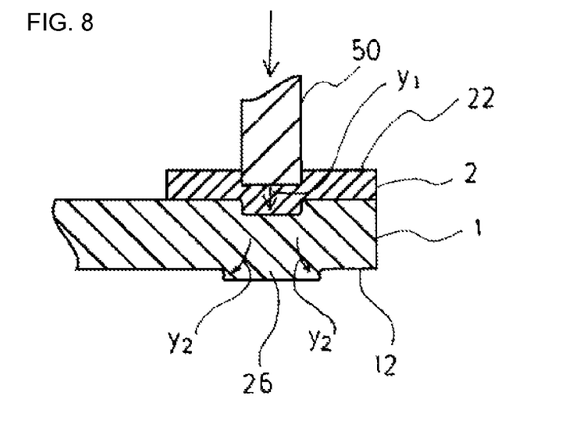
FIG. 8 is another drawing illustrating a joint method of the circular metal plate and the complex material.

An example of a method for joining the complex material 1 and the circular metal plate 2 will now be described with reference to FIGS. 5 to 8. FIG. 7 shows an overlapping condition of the metal plate overlapping portion 12 of the complex material 1 and the complex material overlapping portion 22 of the circular metal plate 2 before partial press working. FIG. 8 shows a process following the FIG. 7, and indicates a halfway point of the partial press working. FIGS. 5 and 6 show a joint condition of the metal plate overlapping portion 12 of the complex material 1 and the complex material overlapping portion 22 of the circular metal plate 2 after the partial press working. FIG. 6 is an enlarged sectional view in the circled area indicated with the two-dotted chain line in FIG. 5.

It is preferable to use a punch 50 whose tip is not sharpened with a comparatively flat surface 51 for the partial press working. In the condition that the metal plate overlapping portion 12 of the complex material 1 and the complex material overlapping portion 22 of the circular metal plate 2 are overlapped with each other, the punch 50 strikes the layered structure downward from the top. The complex material 1 and the circular metal plate 2 are easily deformed during partial press working. The complex material 1 and the circular metal plate 2 are crushed both together in the direction of numeral $y_1$ (downward). They are deformed in the planar direction of numeral $y_2$, and a protrusion portion 26 is formed that extends downward from the bottom end of a lower material. The protrusion portion 26 has a smaller thickness $h_2$ for the initial thickness $h_1$ of the complex material 1 and the circular metal plate 2, and expands in the planar direction $w_2$ for the diameter $w_1$ of the punch 50. Furthermore, the metal plate 2 is dug into the complex material 1 in the planar direction. In this way, in a pressing portion, the complex material 1 and the metal plate 2 are deformed in the depth direction, and the planar direction to form a dug portion 261. The complex material 1 and the circular metal plate 2 are thereby not detached from each other. Because a joint portion 6 is placed on the outside of the flange joint surface, no effect is exerted on sealing properties. The surface of a processed area comes into a concave shape by the partial press working.

Figure 9:
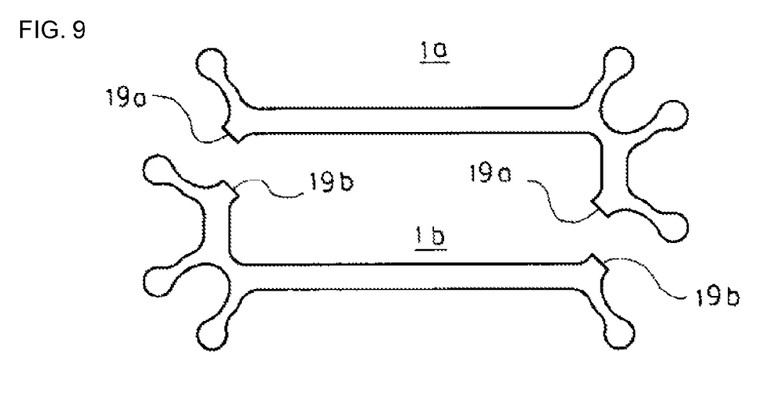
FIG. 9 is a plan view of a gasket in another embodiment of the present invention.
Figure 10:
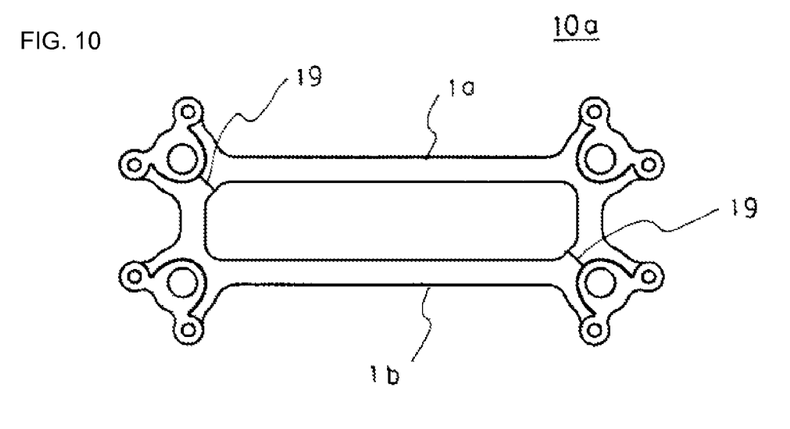
FIG. 10 is a drawing showing a divided gasket of the gasket in FIG. 9.
Figure 11:
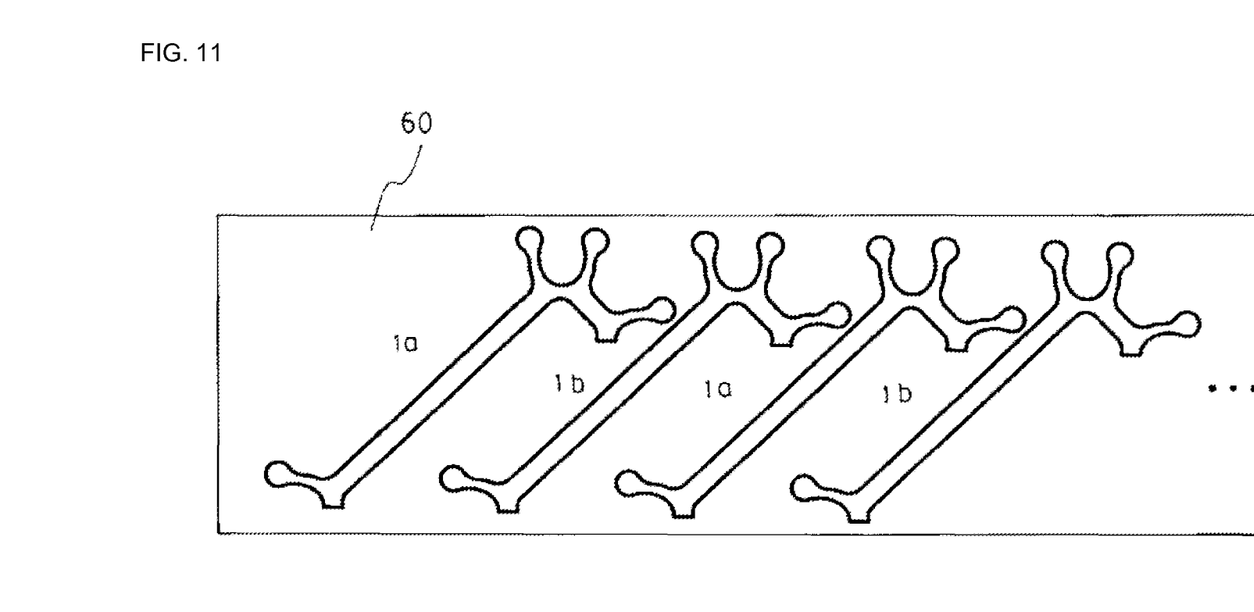
FIG. 11 is a drawing illustrating a method for fabricating a divided gasket from a coil material.

In the present invention, the complex material 1 can be divided into two or more pieces. An example of a divided complex material will be described with reference to FIGS. 9 and 10. A complex material constituting a gasket 10a is made up of two complex materials 1a and 1b. In the complex material 1 constituting the gasket 10 shown in FIG. 1, the two complex materials 1a and 1b are placed in the area corresponding to the flange joint surface. They are cut near a bolt portion, and thus the same shape as the complex material 1 in FIG. 1 is produced together with a cut-off line 19 by engaging a cut-off surface 19a of a complex material is with a cut-off surface 19b of another complex material 1b. These divided complex materials 1a and 1b are cut out with a the from a coiled plate body 60 as shown in FIG. 11. In this way, discarded materials are reduced, and the yield rate of a material is markedly improved. As FIG. 10 shows, the metal plate 2 and the complex material 1a (1b) are joined also on the outside of the flange joint surface. Because of this, the circular metal plate 2 and the complex material 1a (1b) are not detached, for example, during transportation.

In a gasket of the present invention, the clearance 19a (19b) that corresponds to a flange joint surface between divided surfaces on the complex material 1 can be filled with a cured coating material of a liquid sealing agent. With this, the divided complex materials 1 have no clearance therebetween in the area corresponding to the flange joint surface. Further improved sealing properties are thereby obtained. Liquid silicone is given as an example of the liquid sealing agent.

For an apparatus where a gasket of the present invention is assembled, there is no restriction as long as it has opposite flange joint surfaces held with a bolt. Electrical apparatuses for vehicles, which are configured to have an upper device with a corresponding flange surface at its lower end and a lower device with the other corresponding flange surface at its upper end, are given as an example. A gasket of the present invention is assembled between two surfaces of the lower end flange of the upper device and the upper end flange of the lower device. These apparatuses are large compared with apparatuses in, related-art. If a flange portion has low stiffness and the distance between bolts is large, the effects of the present invention are further markedly revealed.

A joint on the outside of a flange joint surface is not limited to the partial press working as above. For example, attaching a complex material overlapping portion and a metal plate overlapping portion with adhesive is applicable. Such a method is also effective that makes either of a complex material overlapping portion and a metal plate overlapping portion as a concave portion and the other as a convex portion in a planar view and interlocks the concave portion with the convex portion. In these joint methods, it is not necessary to bend a complex material overlapping portion or a metal plate overlapping portion upward from a main body portion, and a thin plate is applicable.

The present invention will be further described in detail with an example, however, that is simply for giving an example and is not for limiting the present invention.

EXAMPLE 1

A flange joint surface was formed on the assumption of a large metal case that carries electrical parts for vehicles. After installing a gasket with the following specs thereto and tightening it with a bolt, a sealing test was carried out. As a result, the leaking amount was quite small and excellent sealing properties were observed.
(Flange Surface for Test)
The flange has a shape shown with the two-dotted chain line in FIG. 1. The thickness of a flange was set as 7 mm, and the distance between bolts (the maximum distance) was set as 120 mm.
(Gasket)
A complex material; a complex material has a shape shown in FIG. 1. Foamed rubber layer made of nitrile rubber (NBR) in a thickness of 0.2 mm in each surface was formed on both surfaces of a Cold-rolled steel plate in a thickness of 0.2 mm, and the total thickness ($H_1$) amounted to 0.6 mm. A bead was formed in the shape of protrusion with a thickness ($H_3$) of 1.0 mm.

A circular metal plate; a thickness ($H_2$) of 0.6 mm
(Sealing Test)
The lower jig: an jig in a thickness of 20 mm (a rigid body)
The upper jig: an aluminum jig in a thickness of 7 mm
The tightening condition: 5.6 Nm (an M6 bolt)
The distance between bolts: 120 mm at a maximum and 30 mm at a minimum
The evaluation method of leaking: in a submersion test, the internal pressure when an air bubble floated to the water surface was determined as the leakage pressure.

COMPARATIVE EXAMPLE 1

Except that a complex gasket formed no beads thereon, a complex material and a gasket were fabricated in the same manner of Example 1, and a sealing test was carried out. As a result, leaking was observed at around a third of the internal pressure as compared with Example 1, and enough sealing properties were not indicated.

INDUSTRIAL APPLICABILITY

According to the present invention, the looseness of a bolt is prevented with a metal plate arranged at the area corresponding to the bearing of a bolt, and the sealing function is achieved with a bead of a complex material arranged from the near area of a metal plate to an area between bolts. Good sealing properties are thereby indicated under a harsh tightening condition such as a flange with low stiffness and a flange where the distance between bolts is large. Accordingly, the configuration is applicable for downsizing and a weight reduction in electrical parts and electronic apparatuses of a vehicle.

REFERENCE NUMERALS

1: complex material
2: circular metal plate
3: flange joint surface
3a, 3b: flange
5: through-hole of a bolt
6: joint portion
7: bolt
9: clearance between interlocking portions of a complex material and a metal plate
10, 10a: gasket
11: sealing portion (main body portion)
12: metal plate overlapping portion
15: bead
21: bearing corresponding portion
22: complex material overlapping portion
26: protrusion portion
50: punch

The invention claimed is:
1. A gasket that is held between opposite flange joint surfaces with a bolt, the gasket comprising a combination of:
a complex material with a rubber material formed on one or both sides of a steel plate, the complex material having a bead, wherein the bead includes the steel plate and the rubber material, and
a circular metal plate arranged at a bolt portion with a through-hole where a shank of the bolt penetrates and a bearing corresponding portion that corresponds to a bearing of the bolt around the through-hole; wherein the complex material includes a metal plate overlapping portion that is overlapped with the circular metal plate, the circular metal plate includes a complex material overlapping portion, which is formed away from the through-hole of the circular metal plate, and which is overlapped with the complex material extended from the bearing corresponding portion, and the complex material overlapping portion overlaps with the metal plate overlapping portion and the complex material overlapping portion and the metal plate overlapping portion are joined with each other only at a joint located away from the through-hole of the circular metal plate so that the complex material overlapping portion and the metal plate overlapping portion are joined on the outside of the flange joint surface.

2. The gasket according to claim 1, wherein a rubber layer is formed on one or both surfaces of the circular metal plate.

3. The gasket according to claim 2, wherein the rubber layer has a thickness of 0.020 to 0.025 mm in each surface.

4. The gasket according to claim 1, wherein the thickness ($H_3$) of the bead provided to the complex material is greater than the thickness ($H_2$) of the circular metal plate that is equal to or greater than the thickness ($H_1$) of the complex material.

5. The gasket according to claim 1, wherein a rubber layer provided to the complex material is a foamed rubber layer.

6. The gasket according to claim 1, wherein the joint is performed with partial press working, and the joint shape results from deformation of the complex material and the metal plate at the pressing portion in the depth direction and the planar direction.

7. The gasket according to claim 1, wherein the complex material is divided into two or more pieces, and a dividing position is located in an area corresponding to the flange joint surface.

8. The gasket according to claim 7, wherein clearance between divided surfaces is filled with a cured coating material of a liquid sealing agent.

* * * * *